United States Patent
Lee et al.

(12) United States Patent      (10) Patent No.: US 7,491,451 B2
Lee et al.      (45) Date of Patent: Feb. 17, 2009

(54) ELECTROLUMINESCENT POLYMER NANOCOMPOSITE MATERIAL, METHOD OF MANUFACTURING THE SAME AND ORGANIC LIGHT EMITTING DISPLAY APPARATUS HAVING THE SAME

(75) Inventors: Dong-Won Lee, Seongnam-si (KR); Anatoly Veniaminovich Vannikov, Moscow (RU); Oxana Leonidovna Gribkova, Moscow (RU); Victor Fyodorovich Ivanov, Moscow (RU); Dmitry Alexandrovich Lypenko, Ostrovityanova (RU); Eugheny Ivanovich Mal'tsev, Moscow (RU)

(73) Assignees: Samsung Electronics Co., Ltd. (KR); A.N. Frumkin Institute of Electrochemistry of Russian Academy of Science (RU)

( * ) Notice: Subject to any disclaimer, the term of this patent is extended or adjusted under 35 U.S.C. 154(b) by 439 days.

(21) Appl. No.: 10/981,566

(22) Filed: Nov. 5, 2004

(65) Prior Publication Data
US 2005/0147845 A1     Jul. 7, 2005

(30) Foreign Application Priority Data
Nov. 21, 2003    (RU)    ............................. 2003133971

(51) Int. Cl.
*H01J 29/08* (2006.01)
*H01J 1/62* (2006.01)

(52) U.S. Cl. .................. 428/690; 428/917; 257/40; 257/102; 257/103

(58) Field of Classification Search ............... 428/690, 428/917; 313/504, 506; 252/301.16, 500, 252/512; 427/66; 257/40, 102, 103
See application file for complete search history.

(56) References Cited

U.S. PATENT DOCUMENTS

| | | | |
|---|---|---|---|
| 6,391,471 B1 * | 5/2002 | Hiraoka et al. | 428/623 |
| 7,086,918 B2 * | 8/2006 | Hsiao et al. | 445/24 |
| 2002/0014617 A1 * | 2/2002 | Angelopoulos et al. | 252/500 |

OTHER PUBLICATIONS

Mal'tsev, et al., J-aggregate electroluminescence in dye doped polymer layers, Applied Physics Letters, Dec. 21, 1998, pp. 3641-3643, vol. 73 No. 25, Amer. Inst.of Physics.

Mal'tsev, et al., J-aggregate electroluminescence in polymer matrices, Part of the SPIE Conference on Organic Light-Emitting Materials and Devices III, Jul. 1999, pp. 246-255.

(Continued)

*Primary Examiner*—D. Lawrence Tarazano
*Assistant Examiner*—Camie S Thompson
(74) *Attorney, Agent, or Firm*—Cantor Colburn LLP

(57) ABSTRACT

The present invention is related to electroluminescent polymer materials for use in optoelectronic devices. The electroluminescent polymer materials of the invention may comprise a polymer and an electroluminescent organic component, where the water-soluble polyanilin having an electron-hole conductivity may be used as the polymer and one of a cyanine dye, a porphyrin, in the form of J-aggregates, may be used as the electroluminescent organic component.

5 Claims, 1 Drawing Sheet

OTHER PUBLICATIONS

Mal'tsev, et al., Electroluminescence of polymer/J-aggregate composites, Applied Physics Letters, Sep. 27, 1999, pp. 1896-1898, vol. 75 No. 13, Amer. Inst. of Physics.

Maltsev, et al., Near-infrared electroluminescence in polymer composites based on organic nanocrystals, Applied Phys. Letters, Oct. 14, 2002, pp. 3088-3090, vol. 81 No. 16, Amer. Inst. of Physics.

Kobayashi, T., J-Aggregates, 1996, pp. 42-45, World Scientific Publishing Co. Pte. Ltd., Singapore.

Carter, et al., Enhanced luminance in polymer composite light emitting devices, Applied Physics Letters, Sep. 1, 1997, pp. 1145-1147, vol. 71 No. 9, Amer. Inst. of Physics.

Mattoussi, et al., Electroluminescence from heterostructures of poly (phenylene vinylene) and inorganic CdSe nanocrystals, Mar. 23, 1998, pp. 7965-7974, vol. 0021-8979/98/83(12)/7965/10, American Institute of Physics.

Que, et al., Photoluminescence and electroluminescence form copper doped zinc sulphide nanocrystals/polymer composite, Applied Pnysics Letters, Nov. 9, 1998, pp. 2727-2729, vol. 73 No. 19, American Institute of Physics, US.

Mal'tsev, et al., Electroluminescence of Polymer Nanocomposites—Mol. Cryst. And Liq. Cryst., 2001, pp. 217-222, vol. 361, Overseas Publishers Association, N.V.

Mal'tsev, et al., Electroluminescence in Polymer/J-Aggregate Nanocomposites, IS&T's NIP 16, 2000 International Conference on Digital Printing Technologies.

Tameev, et al., Charge carrier transport in aromatic polyimides and polyimide/J-aggregate composites, Organic Light-Emitting Materials and Devices IV, 2001, pp. 443-449, Proc. SPiE vol. 4105, SPIE.

Von Berlepsch, et al., Network Superstructure of Pseudoisocyanine J-Aggregates in Aqueous Sodium Chloride Solution Revealed by Cryo-Transmission Electron Microscopy, J. Phys. Chem B, 2002, pp. 3146-3150, vol. 106, American Chemical Society, US.

Antoniadis, et al., Carrier deep-trapping mobility-lifetime products in poly(p-phenylene vinylene), Applied Physics Letters, Oct. 17, 1994, pp. 2030-2032, vol. 65 No. 16, American Institute of Physics.

Friend, et al., Electroluminescence in conjugated polymers, Nature, Jan. 14, 1999, pp. 121-128, vol. 397, Nature.

Leising, et al., Efficient full-colour electroluminescence and stimulated emission with polyphenylenes, Synthetic Metals, 1997, pp. 41-47, vol. 91, Elsevier Science S.A.

Mal'tsev, et al., Bright blue-green electroluminescence from aromatic polyimides, Applied Physics Letters, Dec. 15, 1997, pp 3480-3482, vol. 71 No. 24, Amer. Inst.of Phys.

Pei, et al., Efficient Photoluminescence and Electroluminescence from a Soluble Polyfluorene, American Chemical Society, 1996, pp. 7416-7417, UNIAX Corporation.

Berggren, et al., Light-emitting diodes with variable colours from polymer blends, Nature, Dec. 1, 1994, pp. 444-445, vol. 372, Nature.

Greenham, et al., Efficient light-emitting diodes based on polymers with high electron affinities, Nature, Oct. 14, 1993, pp. 628-630, vol. 365, Nature.

Cui, et al., Thiophene-Linked Polyphenylquinoxaline: A New Electron Transport Conjugated Polymer for Electroluminescent Devices, Macromolecules, 1999, pp. 3824-3826, vol. 32, American Chemical Society.

Dailey, et al., An efficient electron-transporting polymer for light-emitting diodes, J. Phys.: Condens. Matter, 1998, pp. 5171-5178, vol. 10, IOP Publishing Ltd.

Jenekhe, et al., Finite Size Effects on Electroluminescence of Nanoscale Semiconducting Polymer Heterojunctions, Chem. Mater., 1997, pp. 409-412, vol. 9, Amer. Chem. Society.

* cited by examiner

ELECTROLUMINESCENT POLYMER NANOCOMPOSITE MATERIAL, METHOD OF MANUFACTURING THE SAME AND ORGANIC LIGHT EMITTING DISPLAY APPARATUS HAVING THE SAME

CROSS-REFERENCE TO RELATED APPLICATIONS

This application claims priority to Russian Patent Application No. 2003133971, filed on Nov. 21, 2003, the disclosure of which is hereby incorporated herein by reference in its entirety.

FIELD OF THE INVENTION

The present invention is related to an electroluminescent polymer nanocomposite material, a method of manufacturing the electroluminescent polymer nonocomposite material, and an organic light emitting display (OLED) apparatus employing the electroluminescent polymer nanocomposite material. In particular, the present invention is related to electroluminescent polymer nanocomposite materials that have electron-hole transport capabilities and a wide radiation spectral band having electroluminescence bands close in width to monochromatic bands. Additionally, the present invention is related to methods of manufacturing the electroluminescent polymer nonocomposite material, and an organic light emitting display (OLED) apparatus employing the electroluminescent polymer nanocomposite material.

BACKGROUND

Electroluminescent materials that are based on nanocrystals of J-aggregates in semiconductor polymer mediums, such as aromatic polyimides, polyvinylcarbazole, and derivatives of polyphenylenevinylene, are known. When J-aggregate polymer nanocomposites comprising molecular nano-size crystals of cyanine dyes are used as light-emitting layers in organic light-emitting diodes, intensive electroluminescence of a saturated color may be observed. The J-aggregates nanocrystals may be in a three-dimensional or one-dimensional filamentary form, which occupy an intermediate position between microcrystals and individual molecules. A distinctive optical characteristic of J-aggregates is the presence of intensive narrow bands of optical absorption and fluorescence, which are positioned in the range from blue to the near IR-region of the spectrum depending on the structure of the molecules of cyanine dyes. Due to their small size, the polymer nanocomposites do not scatter light in thin layers that remain optically transparent even with a large content of the nanophase. None of the known types of electroluminescent nanocomposite materials have such optoelectronic properties. The J-aggregate-based materials combine optical characteristics typical for organic molecular crystals as well as the physicomechanical and current conducting properties of polymer semiconductors.

The formation of known polymer electroluminescent layers may be prepared as follows. A polymer and a cyanine dye may be dissolved in a nonpolar organic solvent which may comprise chlorine atoms in tetrachloroethane. Then, the solution may be spin-coated onto a conducting substrate, such as a glass plate coated with a transparent electroconductive film of tin and indium tin oxides (ITO), and the solvent may be evaporated to form a solid film. The formation of J-aggregates occurs in the liquid solution of the dye and the polymer in the organic solvent.

A disadvantage of the known J-aggregate polymer nanocomposites is the extreme limitation in selection of initial molecule structures of cyanine dyes for the formation of the nanocrystalline phase. This is due to poor solubility of salt-like compounds, such as cyanine dyes in nonpolar organic solvents. Additionally, even in the case of relatively well-dissolved cyanine dyes, the formation of J-aggregates is difficult, since the probability of formation of J-aggregates from a monomolecular form is greatly reduced upon transition from polar to nonpolar solvents. A property characteristic for cyanine dyes is the effective formation of nanocrystals of J-aggregates in water and aqueous solutions. However, the necessity to use nonpolar organic solvents is related to the insolubility of known polymers with electron-hole transport in polar solvents. In addition, the dyes may not provide a stable thermoresistant nanophase of J-aggregates and a wide range of electroluminescence characteristics.

SUMMARY OF THE INVENTION

The present invention is directed to electroluminescent polymer materials based on J-aggregates of cyanine dyes, porphyrins, squarylium dyes and water-soluble polyaniline, for use as polymer light-emitting diodes. The present invention is also directed to methods of forming the J-aggregates in electrically active polymeric matrixes. Additionally, the present invention also provides an organic light emitting display (OLED) apparatus comprising the electroluminescent polymer material.

DETAILED DESCRIPTION OF THE INVENTION

Figure 1:
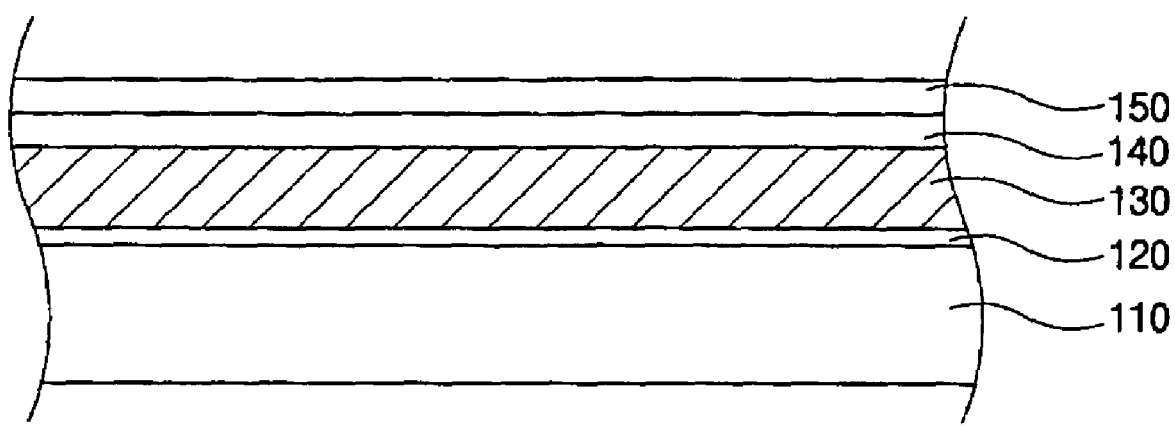
FIG. 1 depicts a cross-sectional view showing an organic light emitting display apparatus according to an embodiment of the present invention.

In an embodiment of the present invention, an electroluminescent polymer composition may comprise a polymer and an electroluminescent organic component. The composition may be characterized such that a water-soluble polyanilin having an electron-hole conductivity may be used as the polymer and a cyanine dye or squarylium dye or porphyrin, which are in the form of J-aggregates, may be used as the electroluminescent organic component, where the ratio of the components may comprise the water-soluble polyanilin in the range of about 50 wt. % to about 99.5 wt. %, and the organic component in the form of J-aggregates may be in a range of about 50 wt. % to about 0.5 wt. %.

In a particular embodiment, methods of forming the J-aggregates in electrically active polymeric matrixes may comprise directly introducing cyanine dyes into water solutions of polyaniline. In this case, the overwhelming majority of dye molecules may transfer into a nanocrystalline phase of J-aggregates. With some types of dyes, however, the formation of a dimeric form (a dimer) having a spectrum of fluorescence that partially overlaps the band of J-aggregates is also possible. The dimeric form of aggregates is an effective luminophor having a wide radiation band, which decreases color characteristics of the electroluminescent polymer materials based on J-aggregates. A temperature cycling method during which the dimeric form of the cyanine dyes is converted into the J-aggregate form may be used in order to remove the undesirable effect. In order to do this, an initial solution of the J-aggregates or a freshly prepared layer of the composite may be subjected to a thermal treatment where a sample is gradually heated to a temperature in the range of about 50° C. to about 70° C. and then is slowly cooled to a temperature in the range of about 10° C. to about 15° C. While carrying out the spectrophotometric control, the thermal treatment step may be repeated until all the dimers are converted into the form of J-aggregates.

In another embodiment, methods of forming the J-aggregates in electrically active polymeric matrixes may comprise introducing cyanine dyes into water solutions of polyaniline to transfer the cyanine dyes into a nanocrystalline phase of J-aggregates, and then multiple thermal cycling by cooling the cyanine dyes to a temperature of about +7° C. and then heating the cooled cyanine dyes to a temperature of about +20° C.

According to particular embodiments of the present invention, an organic light emitting display apparatus may comprise a transparent plate, a first electrode, a light emitting layer, a second electrode and a protecting layer. The first electrode may be arranged on the transparent plate. The light emitting layer may be arranged on the first electrode having an electroluminescent polymer material. The electroluminescent polymer material may comprise a polymer and an electroluminescent organic component. The polymer material may be characterized such that a water-soluble polyanilin having an electron-hole conductivity may be used as the polymer and a cyanine dye or squarylium dye or porphyrin, which are in the form of J-aggregates, may be used as the electroluminescent organic component, where the ratio of the components may comprise the water-soluble polyanilin in the range of about 50 wt. % to about 99.5 wt. %, and the organic component in the form of J-aggregates in the range of about 50 wt. % to about 0.5 wt. %. The second electrode may be arranged on the light emitting layer. The protecting layer may be arranged on the second electrode to protect the second electrode and the light emitting layer. The invention may be based on the capability of polymer nanocomposites comprising J-aggregates to combine the optical properties typical for organic molecular crystals and good current-conducting and physicomechanical characteristics of polymer semiconductors.

The polymer material of the present invention may be used in organic light-emitting diode structures as light-emitting layers, in fiber-optic information transmitting systems, and also in other optoelectronic devices. In all cases, the electroluminescent material may be placed between two electrodes (one of which or both are transparent in the luminescence spectral region). When the necessary potential difference is applied, electrons and holes are injected into the material from the cathode and the anode, respectively, and the electroluminescence occurs during electron-hole recombination. The development of new electroluminescent layers may be necessary in order to increase the energy efficiency of electroluminescent devices (to increase the effectiveness of injection of charge carriers, mobility, quantum output of recombination luminescence), to expand the spectral band and improve the spectral characteristics of electroluminescence and to enhance the stability of operation of electroluminescent devices. An electroluminescent polymer material may be prepared on the base of cardinally expanded set of structures of cyanine dyes which form stable, with a binding energy of more than about 20 kcal/mol, nanocrystals of J-aggregates which radiate in a wide spectral band.

An electroconductive polymer, such as water-soluble polyanilin, may be used as the active polymer medium for formation of J-aggregates. The water-soluble polymer may have high solubility in water and in water-organic mixtures, and solutions may be characterized by high time stability and high temperature stability. Layers based on the water-soluble polyanilin may have high optical and mechanical properties. The relative content of nitrogen-containing groups and acid groups in the polymer may change over wide ranges. As a result, the conditions for the formation of J-aggregates of cyanine dyes may also vary over wide ranges, which have a strong effect on the parameters of the layers for light-emitting devices. Furthermore, when a water-soluble polyanilin is used, a high local concentration of protons near the polymer skeleton may be provided, which is important in principle for the growth of J-aggregates of porphyrins, and in a number of cases, for the growth of filamentary structures of aggregates of cyanine dyes. The formation of nanocrystals takes place along the polymer chain, thereby promoting directed orientation. Moreover, the material acquires important anisotropic properties, providing for the maximally favorable conditions for directed transport of both the holes and the electrons in the polymer layer.

An electroluminescent polymer material used in organic light-emitting diodes as a recombination and light-emitting layer should simultaneously have effective electron-hole transport and comprise photoluminescence centers with a high quantum output of recombination luminescence. A unique property of the J-aggregates, which distinguishes the J-aggregates from other organic supramolecular structures, is the presence of high electron-hole conductivity. The J-aggregates are an electron-hole conducting phase in nanocompositions based on aromatic polyimides and a number of polyphenylenevinylenes. The electron mobility in the J-aggregates is higher than the hole mobility and exceeds about $10^{-4}$ cm$^2$/V s in an electric field of about $10^6$ V/cm, which corresponds to the working strength (working intensity) of electric fields in organic light-emitting diodes. The J-aggregates are supramolecular systems of elongated form. Such filamentary structures may be several hundred nanometers in length. As indicated above, thin composite layers may comprise filamentary molecular crystals which are oriented perpendicular to the planes of electrodes in the sandwich structures of light-emitting diodes. Such an anisotropic state of the nanophase provides a directed transport of charge carriers of both signs, which are injected from opposite electrodes into the composite layer, along the conducting filaments of the J-aggregates towards each other. The recombination process of the electrons and holes to generate excitation states, which occurs directly on the J-aggregate, proceeds with an effectiveness close to 1 (100%). In general the values of the oxidizing potentials of the J-aggregates do not exceed the oxidizing potentials of the cyanine dyes. Alternatively, the values of the reduction potentials of the J-aggregates are greater than the reduction potentials of the cyanines. A purposeful selection of the electro-active polymer binder and the type of J-aggregates which have corresponding energy values of the higher occupied (HOMO) and lower free (LUMO) orbitals provides for the electron-hole transport only along filamentary channels of the nanophase.

A relatively high electroluminescence effectiveness of the nanocomposites based on the J-aggregates is observed even in single-layer light-emitting diode structures where the working layer is placed between two electrodes having different values of the work function. The low working characteristics of the single-layer light-emitting diode structures (LEDs) may occur for several reasons. First, a difficulty in injection of charge carriers from the electrode into the light-emitting layer at the polymer/anode and polymer/cathode interfaces is due to the non-coincidence of the work function values of the anode and cathode, on one hand, with a position of the level of the higher occupied (HOMO) and lower free (LUMO) molecular orbitals of the polymer, on the other hand, respectively. Additionally, there is a strong difference in the mobility values of electrons and holes in the semiconductor polymer materials, which disturbs the balance in the transport of charge carriers. For example, the mobility values of electrons and holes are very different in polymer semiconductors such as polyphenylenevinylene, polyphenylenes, aromatic polyimides, polyfluorenes, and polythiophenes. In these materials, the hole mobility values exceed the electron mobility values by several orders. An important advantage of the J-aggregate-based nanocomposites over the known polymer systems is that this nanocrystalline phase sharply reduces this difference in mobility and, for some types of aggregates, the electron mobility is greater than the hole mobility. Therefore, the use of the J-aggregates-based nanocomposites in single-layer light-emitting diode structures may be advantageous.

The effectiveness and brightness of electroluminescent light-emitting diodes on the base of polymer/J-aggregate nanocomposites may be increased when double-layer structures having an interface of n-type polymer/p-type polymer based on the J-aggregates are used. The use of n-type polymers in this case may reduce the height of the barrier against injection of electrons from the cathode into the working layer, thereby greatly enhancing the working characteristics of the light-emitting diodes. Conductivity of the n-type may be realized in polymers that comprise oxadiazole substituents in the side chains and also in polyconjugated polymers, for example, polycyanoterephthalylidenes, polyphenylenequinoxalines, polypyridines, and polyquinolines.

EXAMPLES

Specific Example 1

An electroluminescent polymer nanocomposite material based on J-aggregates was prepared as follows. A predetermined amount of polyaniline was dissolved in water on the basis of about 99.5 wt. % of polyaniline to about 0.5 wt. % of a cyanine dye (3,3'-di(γ-sulfopropyl)-9-ethyl-5,5'-dichloroxacarbocyanine triethylammonium salt having a electroluminescence spectrum with a maximum at about 575 nm or 3,3'-di(γ-sulfopropyl)-9-ethyl-5,5'-dimethoxythiacarbocyaninepyridinium triethylammonium salt having a electroluminescence maximum at about 675 nm). Then, a powder of the cyanine dye in the amount indicated above was introduced into the solution of polyaniline at room temperature. The solution changed color resulting from the transition of the cyanine dye molecules into the nanocrystalline phase. The process was controlled spectrophotometrically. Prior to spin-coating the solution onto the current-conducting substrate, the substrate was thoroughly cleaned in an ultrasound bath containing a detergent solution, in a mixture of isopropanol/deionized water (about 1:1 by volume), toluene, deionized water and acetone. At the last step of cleaning, the surface of $In_2O_3/SnO_2$ was exposed to an oxygen plasma. Glass plates were used as the substrates, which were coated with a transparent layer of $In_2O_3/SnO_2$ having a resistance in the range of about 16 Ohms/square to about 20 Ohms/square. The solution was spin-coated onto the substrate in a centrifuge at a speed in the range of about 800 rpm to about 3000 rpm. The resultant layer was dried in a forevacuum at a temperature of about 40° C. for about 60 miliminutes.

In order to form a metal cathode, calcium or aluminum was sputtered onto the composite layer in a vacuum of about $5\times10^{-6}$ torr. The cathode layer had a thickness in the range of about 100 mm to about 150 nm. An area occupied by each device was about 6 mm². The electroluminescence radiation effectiveness was up to about 0.8 lumen/W at a potential of about 15 V. Measurements were carried out in an argon atmosphere. In the case of a triethylamonium salt of 3,3'-di(γ-sulfopropyl)-9-ethyl-5,5'-dichloroxacarbocyanine, the electroluminescence had a maximum at 575 nm. In the case of 3,3'-di(γ-sulfopropyl)-9-ethyl-5,5'-dimethoxythiacarbocyaninepyridinium, a maximum of the electroluminescence spectrum was at 675 nm. The electroluminescence effectiveness of the layer sharply decreased at a concentration of the dye below about 0.5 wt. %.

Specific Example 2

An electroluminescent polymer nanocomposite material based on J-aggregates was prepared as follows. A predetermined amount of polyaniline was dissolved in water on the basis of about 50 wt. % of polyaniline to about 50 wt. % of a cyanine dye (3,3'-di(γ-sulfopropyl)-4,5,4',5'-dibenzo-11-diphenylamino-10,12-dimethylenethiacarbocyaninebetain triethylammonium salt having a electroluminescence spectrum with a maximum at about 1100 nm). Then, a powder of the cyanine dye in the amount indicated above was introduced into the solution of polyaniline at room temperature. Prior to sprinkling the solution onto the current-conducting substrate, the substrate was thoroughly cleaned. Glass plates were used as the substrates and were coated with a transparent layer of $In_2O3/SnO_2$ having a resistance in the range of about 16 to about 20 Ohms/square. Prior to sprinkling the solution, the plates were successively cleaned in an ultrasound bath containing a detergent solution, in a mixture of isopropanol/deionized water (about 1:1 by volume), toluene, deionized water and acetone. At the last step of cleaning, the $In_2O_3/SnO_2$ surface was exposed to an oxygen plasma. The solution was spin-coated onto the substrate in a centrifuge at a speed in the range of about 800 rpm to about 3000 rpm. The resultant layer was dried in a forevacuum at a temperature of about 40° C. for about 60 miliminutes. In order to form a metal cathode, calcium or aluminum was sputtered onto the composite layer in a vacuum of about $5\times10^{-6}$ torr. The cathode layer had a thickness in the range of about 100 nm to about 150 nm. An area occupied by each device was about 6 mm². The electroluminescence radiation effectiveness at a wavelength of about 1100 nm was up to about 1% at a potential of about 15 V. Measurements were carried out in an argon atmosphere. The effectiveness of the formation of J-aggregates sharply decreased at a concentration of the dye below about 0.5 wt. % where the dye remains mainly in a monomolecular form. When the dye concentration was above about 50 wt. %, the J-aggregates combined into larger crystalline formations. As a result, the transparency of the layer was decreased and a decrease in the electroluminescent characteristics were observed.

Specific Example 3

An electroluminescent polymer nanocomposite material based on J-aggregates was prepared as follows. A predetermined amount of polyaniline was dissolved in water on the basis of about 50 wt. % of polyaniline to about 50 wt. % of a cyanine dye. Then, a powder of the cyanine dye in the amount indicated above was introduced into the solution of polyaniline at room temperature. The solution changed color resulting from the transition of the cyanine dye molecules into the nanocrystalline phase of J-aggregates. The process was controlled spectrophotometrically. When using the above indicated amount of dye, dimers may form simultaneously with the J-aggregates in the solutions. Consequently, the dimers impaired the spectral characteristics of the composites, which was evidenced by a loss of color saturation in the electroluminescence spectrum caused by superposition of the radiation band of the dimers. In order to convert the dimeric form of the cyanine dyes into the nanocrystalline phase, the solution was subjected to multiple thermal cycling by rapid cooling to a temperature of about +7° C. and by subsequently heating to about +20° C. The transition of the dimers into the nanophase of the J-aggregates was controlled using the form of electroluminescence spectrum of the nanocomposite. Prior to spin-coating the solution of J-aggregates onto the substrate, the current-conducting substrate was thoroughly cleaned. Glass plates were used as the substrates, which were coated with a transparent layer of $In_2O_3/SnO_2$ having a resistance in the range of about 16 Ohms/square to about 20 Ohms/square. The substrates were successively cleaned in an ultrasound bath with a detergent solution, in a mixture of isopropanol/deionized water (about 1:1 by volume), toluene, deionized water and acetone. At the last step of cleaning, the $In_2O_3/SnO_2$ surface was exposed to an oxygen plasma. The spin-coating was carried out in a centrifuge at a speed in the range of about 800 rpm to about 3000 rpm. Then, the solution was dried in a forevacuum at a temperature of about 40° C. for about 60 miliminutes. In order to form a metal cathode, calcium or aluminum was sputtered onto the composite layer in a vacuum of about $5\times10^{-6}$ torr. The cathode layer had a thickness in the range of about 100 nm to about 150 nm. The area occupied by each device was about 6 mm². The electroluminescence radiation effectiveness was up to about 0.1 lumen/W at a potential of about 15 V. Measurements were carried out in an argon atmosphere. When a triethylamonium salt of 3,3'-di(γ-sulfopropyl)-9-ethyl-5,5'-dichloroxacarbocyanine was used, the electroluminescence had a maximum at about 575 nm. When a 3,3'-di(γ-sulfopropyl)-9-ethyl-5,5'-dimethoxythiacarbocyaninepyridinium was used, a maximum of the electroluminescence spectrum was at about 675 nm.

Specific Example 4

An electroluminescent polymer nanocomposite material based on J-aggregates for light-emitting devices on a flexible substrate was prepared as described in Examples 1 and 2. A polyester film of Orgacon™ EL (350 Ohms/square) (Agfa) was used as the substrate. The substrate was cleaned by blowing the conducting $In_2O_3/SnO_2$ surface with a stream of ionized air and by subsequently irradiating the substrate with a xenon lamp having a wavelength of about 172 nm. A sample was placed adjacent to the surface of the lamp shell in a box in an atmosphere of dry air. The solutions comprising J-aggregates of a triethylamonium salt of 3,3'-di(γ-sulfopropyl)-9-ethyl-5,5'-dichloroxacarbocyanine (the electroluminescence spectrum has a maximum at about 575 nm) or 3,3'-di(γ-sulfopropyl)-9-ethyl-5,5'-dimethoxythiacarbocyaninepyridinium (the spectrum of electroluminescence of the composite has a maximum at about 675 nm) were spin-coated onto the substrate in a centrifuge at a speed in the range of about 800 rpm to about 3000 rpm. Then, the solution was dried in a forevacuum at a temperature of about 40° C. for about 60 miliminutes. In order to form a metal cathode, calcium or aluminum was sputtered onto the composite layer in a vacuum of about $5\times10^{-6}$ torr. The cathode layer had a thickness in the range of about 100 nm to about 150 nm. The area occupied by each device was about 6 mm². The electroluminescence radiation effectiveness was up to about 0.01 lumen/W at a potential of about 15 V. Measurements were carried out in an argon atmosphere.

Specific Example 5

An electroluminescent polymer nanocomposite material based on J-aggregates of squarylium dyes was prepared as follows. A predetermined amount of polyaniline was dissolved in water on the basis of about 95 wt. % of polyaniline to about 5 wt. % of a squarylium dye having indoline or phenyl substituents. Then, a powder of the squarylium dye in the amount indicated above was introduced into the solution of polyaniline. The solution changed color as a result of the transition of the squarylium dye molecules into the nanocrystalline phase. The process was controlled spectrophotometrically. The current-conducting substrate was cleaned prior to spin-coating. Glass plates were used as the substrates, which were coated with a transparent layer of $In_2O_3/SnO_2$ having a resistance in the range of about 16 Ohms/square to about 20 Ohms/square. The plates were successively cleaned in an ultrasound bath containing a detergent solution, in a mixture of isopropanol/deionized water (about 1:1 by volume), toluene, deionized water and acetone. At the last step of cleaning, the $In_2O_3/SnO_2$ surface was exposed to an oxygen plasma. The solution was spin-coated onto the substrate in a centrifuge at a speed in the range of about 800 rpm to about 3000 rpm. The obtained layer was dried in a forevacuum at a temperature of about 40° C. for about 60 miliminutes. In order to form a metal cathode, calcium or aluminum was sputtered onto the composite layer in a vacuum of about $5\times10^{-6}$ torr. The cathode layer had a thickness in the range of about 100 nm to about 150 nm. The area occupied by each device was about 6 mm². The electroluminescence radiation effectiveness was up to about 0.03 lumen/W at a potential of about 15 V. Measurements were carried out in an argon atmosphere. The maximums of the electroluminescence spectra for the squarylium dye-based nanocomposites were in the range of about 600 nm to about 900 nm.

Specific Example 6

An electroluminescent polymer nanocomposite material based on J-aggregates of porphyrins was prepared as follows. A predetermined amount of polyaniline was dissolved in water on the basis of about 95 wt. % of a polyaniline to about 5 wt. % of porphyrin comprising substituents. Then, a powder of the porphyrin in the amount indicated above was introduced into the solution of polyaniline at room temperature. The solution changed color as a result of the transition of the porphyrin molecules into the nanocrystalline phase. The process was controlled spectrophotometrically. The current-conducting substrate was thoroughly cleaned prior to spin-coating. Glass plates were used as the substrates, which were coated with a transparent layer of $In_2O_3/SnO_2$ having a resistance in the range of about 16 Ohms/square to about 20 Ohms/square. The plates were successively cleaned in an ultrasound bath containing a detergent solution, in a mixture of isopropanol/deionized water (about 1:1 by volume), toluene, deionized water and acetone. At the last step of cleaning, the $In_2O_3/SnO_2$ surface was exposed to an oxygen plasma. The solution was spin-coated onto the substrate in a centrifuge at a speed in the range of from about 800 rpm to about 3000 rpm. The resultant layer was dried in a forevacuum at a temperature of about 40° C. for about 60 miliminutes. In order to form a metal cathode, calcium or aluminum was sputtered onto the composite layer in a vacuum of about $5\times10^{-6}$ torr. The cathode layer had a thickness in the range of about 100 nm to about 150 nm. The area occupied by each device was about 6 mm². The electroluminescence radiation effectiveness was up to about 0.01 lumen/W at a potential of about 15 V. Measurements were carried out in an argon atmosphere. The maximums of the electroluminescence spectra of the porphyrin-based nanocomposites were in the range of about 650 nm to about 900 nm depending on the structure of the initial porphyrin molecules.

Organic Light Emitting Display (OLED) Apparatus

FIG. 1 shows a cross-sectional view of an organic light emitting display (OLED) apparatus in accordance with an exemplary embodiment of the present invention. Referring to FIG. 1, the OLED apparatus comprises a glass substrate 110, a first electrode 120, a light emitting layer 130, a second electrode 140 and a protecting layer 150. The anode 120 may be arranged on the glass substrate 110. The first electrode 120 has a metal. A first voltage may be applied to the first electrode 120 through a driving thin film transistor (not shown) and a switching thin film transistor (not shown). The light emitting layer 130 may be arranged on the first electrode 120. The light emitting layer 130 may comprise an electroluminescent polymer material having a polymer in an amount in the range of about 50 wt. % to about 99.5 wt. % and an electroluminescent organic component in the range of 50 wt. % to about 0.5 wt. %. The polymer may comprise water-soluble polyanilin having an electron-hole conductivity. The electroluminescent organic component may have a cyanine dye, a squarylium dye, and poryphyrin, for example, which are in the form of J-aggregates.

The second electrode 140 may be arranged on the light emitting layer 130. The second electrode 140 may have a transparent conductive material such as indium tin oxide (ITO), tin oxide (TO), indium zinc oxide (IZO), and zinc oxide (ZO), for example. A second voltage may be applied to the second electrode 140. Alternatively, a buffer layer (not shown) may be arranged between the light emitting layer 130 and the second electrode 140.

When the first and second voltages are applied to the first electrode 120 and the second electrode 140, a current flows through the light emitting layer 130 to generate a light. The protecting layer 150 may be arranged on the second electrode 140 to protect the second electrode 140 and the light emitting layer 130 from an impurity and an impact that are provided from an exterior to the OLED apparatus.

The present invention may increase the energy efficiency of electroluminescent devices. In addition, the effectiveness of the injection of charge carriers, mobility, quantum output of recombination luminescence may be improved. Therefore, the spectral characteristics of electroluminescence are improved thereby enhancing the stability of operation of electroluminescent devices.

What is claimed is:

1. An electroluminescent polymer composition, comprising:
   a polymer comprising a water-soluble polyaniline in the range of about 50 wt. % to about 99.5 wt. %, wherein the water-soluble polyaniline has an electron-hole conductivity; and
   an electroluminescent organic component comprising a dye selected from the group consisting of a cyanine dye, a squarylium dye and a porphyrin in the range of about 50 wt. % to about 0.5 wt. %, wherein the electroluminescent organic component has a form of J-aggregates.

2. A method for preparing J-aggregates in electrically active polymeric matrixes, comprising:
   introducing cyanine dyes into water solutions of polyaniline to transfer the cyanine dyes into a nanocrystalline phase of the J-aggregates;
   heating the cyanine dyes to a temperature in the range of about 50° C. to about 70° C.; and
   cooling the heated cyanine dyes to a temperature in the range of about 10° C. to about 15° C.

3. The method of claim 2, wherein the heating and the cooling are repeated.

4. A method for preparing J-aggregates in electrically active polymeric matrixes, comprising:
   introducing cyanine dyes into water solutions of polyaniline to transfer the cyanine dyes into a nanocrystalline phase of the J-aggregates; and
   multiple thermal cycling by cooling the cyanine dyes to a temperature of about +7° C.; and
   heating the cooled cyanine dyes to a temperature of about +20° C.

5. An organic light emitting display apparatus, comprising:
   a transparent plate;
   a first electrode arranged on the transparent plate; and
   a light emitting layer arranged on the first electrode comprising an electroluminescent polymer material, wherein the electroluminescent polymer material comprises:
   a water-soluble polyaniline in the range of about 50 wt. % to about 99.5 wt. %, wherein
   the water-soluble polyaniline has electron-hole conductivity; and
   an electroluminescent organic component comprising a dye selected from the group consisting of a cyanine dye, a squarylium dye or a porphyrin in the range of about 50 wt. % to about 0.5 wt. %, wherein the electroluminescent organic component is a form of a J-aggregate;
   a second electrode arranged on the light emitting layer; and
   a protecting layer arranged on the second electrode, wherein the protecting layer protects the second electrode and the light emitting layer.

* * * * *